United States Patent [19]
Kennard

[11] 3,903,603
[45] Sept. 9, 1975

[54] DENTAL PIN INTERFACE PLATE

[76] Inventor: John Kennard, 222 F Ave., Coronado, Calif. 92113

[22] Filed: Aug. 23, 1974

[21] Appl. No.: 499,835

[52] U.S. Cl. .................................... 32/15; 32/15
[51] Int. Cl.² ........................................ A61K 5/02
[58] Field of Search ............................. 32/15, 7, 6

[56] References Cited
UNITED STATES PATENTS
| | | | |
|---|---|---|---|
| 603,179 | 4/1898 | Davison | 32/15 |
| 1,262,629 | 4/1918 | Brouillet | 32/15 |
| 3,728,794 | 4/1973 | Edelman | 32/15 |

Primary Examiner—Robert Peshock
Attorney, Agent, or Firm—Ralph S. Branscomb

[57] ABSTRACT

The invention is an interface plate and a method of using same to securely bond dental amalgam to the remaining structure of an injured tooth to replace a portion of the tooth which has been destroyed. The plate has a flat side which is cemented to a prepared surface of the tooth and one or more projections extending from the other side to securely engage dental amalgam which is applied to the interface plate.

6 Claims, 9 Drawing Figures

PATENTED SEP 9 1975　　3,903,603

DENTAL PIN INTERFACE PLATE

BACKGROUND OF THE INVENTION

1. Field of the Invention

The invention relates to the field of restorative dentistry and particularly to rebuilding teeth having portions which have been destroyed by caries or accident.

2. Description of the Prior Art

The restoration of teeth having areas which have been destroyed basically involves the preparation and cleaning of the cavities preferably such that the opening is restricted, and filling the cavities with dental amalgam. If all or a major portion of the crown is destroyed, there may be insufficient dentin remaining for the amalgam to purchase properly so that in some instances a small metal core post is screwed or driven with a mallet partially into the tooth root and the amalgam is applied over the extending shank of the post so that the required bonding strength is achieved. A similar relatively recently developed technique utilizes pins which are screwed and/or glued into predrilled holes in the remaining dentin and serve the same general purpose as a core post.

Although the use of pins and posts enables the restoration of teeth in such advanced states of deterioration that repair would not otherwise be possible, there are serious problems inherent in their use. When core posts are inserted into the tooth, dental cement is first applied to the root canal and when the post is driven in thereafter the cement may develop a high hydraulic pressure which fractures the tooth. Some danger of fracturing accompanies the use of pins also, but the primary problem with pins lies in the risk of screwing them entirely through the tooth until they exit the far side, which is by no means a rare occurence.

SUMMMARY OF THE INVENTION

The invention is a means and method of restoring partially destroyed teeth without the use of pins or posts and comprises a small plate which is cemented to a prepared surface of the tooth in the destroyed area. The exposed side of the plate is provided with one or more amalgam retaining projections which extend from the prepared surface of the tooth and serve the function of the projecting shanks of the pins and core posts currently in use. The drilling, driving, and screwing operations and the associated hazards are thus circumvented while providing a strong, lasting bond between the amalgam and the tooth.

DETAILED DESCRIPTION OF THE PREFERRED EMBODIMENT

Figure 1:
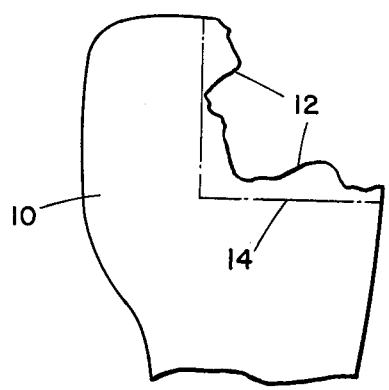
FIG. 1 is a side elevation view of a typical damaged molar, with the outline of the intended cut indicated.
Figure 2:
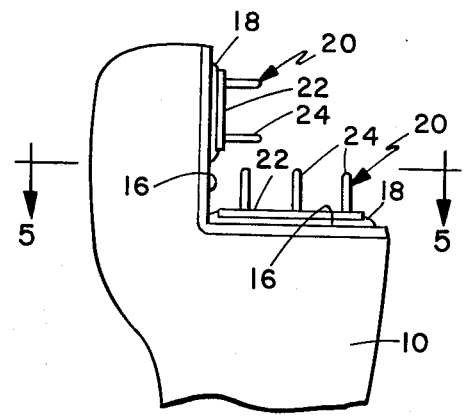
FIG. 2 is a side elevation view of the cut away molar with retaining plates in place.
Figure 3:
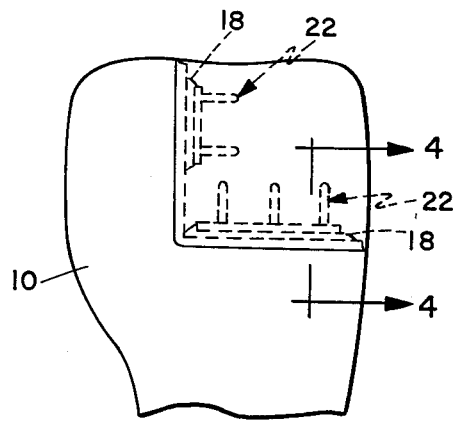
FIG. 3 illustrates the finished capped tooth.
Figure 4:
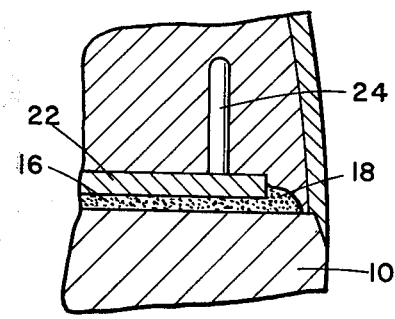
FIG. 4 is an enlarged sectional view taken on line 4—4 of FIG. 3.
Figure 5:
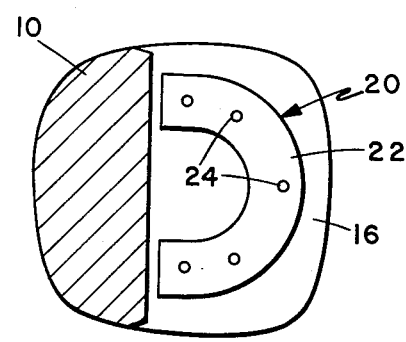
FIG. 5 is a sectional view taken on line 5—5 of FIG. 2.

FIGS. 1 – 3 illustrate a damaged tooth 10 in various stages of restoration. An extensive portion of the tooth has been destroyed leaving rough cavity walls 12 which prior to restoration must be cleaned and filled down to the levels indicated by the broken line 14, removing surface irregularities to produce smooth, prepared surfaces 16. A layer of dental adhesive 18 is then applied to each of the prepared surfaces, and a novel interface plate 20 is placed on each cement layer and the cement is allowed to dry. Dental amalgam is then applied to the cavity and may be shaped to the original contours of the tooth, or fall slightly short of the original surface and be capped with gold or other durable substance, in which latter case the gold should slightly overlap the tooth structure at the edges as shown in FIG. 4 to prevent invasion of bacteria at the interface.

The term "amalgam" in dentistry refers to a mixture of particulate matter, generally silver, in a malleable vehicle which sets to form a tough, hard base. Amalgam is used extensively in dentistry, but the term as used in this description and the claims is intended to include all fillers which may be used now or in the future in restorative dentistry regardless of whether or nor they are technically amalgams.

The structure of the interface plate 20 is subject to numerous variations which are subject to several limitations. One principal limitation is that one side of the plate must be on the whole shaped to substantially conform to the prepared surface of the tooth to which it will be cemented, which is flat in all the embodiments shown, although of course curved surfaces could be used. This side of the plate need not be smooth, inasmuch as some irregularities may be found advantageous to produce increased bonding strength. The other side of the interface plate must be provided with some sort of structure on which the amalgam can securely purchase.

Figure 6:
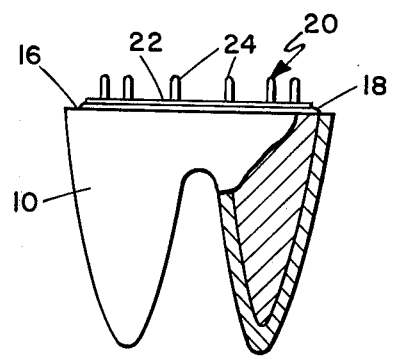
FIG. 6 is a side elevation view, partially cut away, of a cut off molar with a retaining plate attached.
Figure 7:
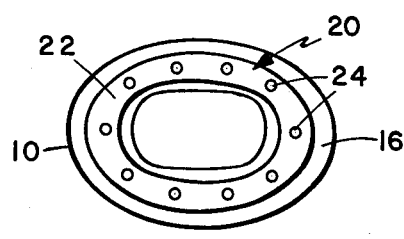
FIG. 7 is a view looking down on the tooth of FIG. 6.

Within these limitations three exemplary modifications are disclosed. The first, shown in FIGS. 2 – 6, comprises a plate element 22 having pins 24 which are welded or otherwise securely mounted on the plate, the pins and plate preferably being made of a non-corrosible metal such as platinum-irridium or stainless steel. In planform the plate element will naturally vary with the surface on which it is adhered, the horseshoe shape of FIGS. 2 – 5 and the oval annular shape of FIGS. 6 and 7 both being chosen to substantially cover the exposed surface of the tooth dentin without interfering with the central root area. The pins may be bent, hooked or provided as returning loops to further the purchasing ability of the amalgam.

Figure 8:
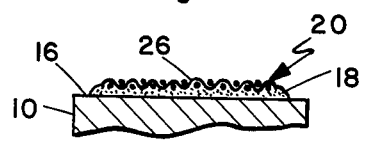
FIG. 8 illustrates an alternative screen type retaining plate on a sectioned tooth.
Figure 9:
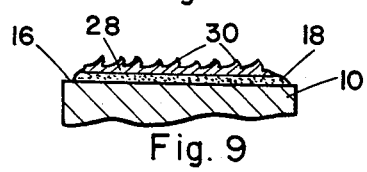
FIG. 9 illustrates a further toothed type retaining plate.

FIG. 8 illustrates a variation in which the interface plate is a small section of screen 26 which may have an exaggerated weave or other structure to more securely engage the amalgam. Finally, FIG. 9 represents a modification having a plate element 28 similar to that of the multiple pin embodiment but burrs 30 upstruck from the plate surface replace the pins, eliminating the necessity of a welding operation. Other modifications within the limitations required of the interface plate are clearly conceivable, and the examples illustrated or discussed are not intended to limit the invention beyond a strict interpretation of the claims.

The cement used in the layer 18 should be one of the newly developed organic types which form chemical bonds with both metal and dentin. The development of these cements makes the use of the interface plate possible since with less effective adhesives the plates and amalgam would very probably become dislodged due to the stresses created in normal chewing.

I claim:

1. An interface plate for use in bonding dental amalgam to a prepared surface of an injured tooth comprising:
   a corrosion-resistant plate element dimensioned to cover a portion of a prepared tooth surface;
   one side of said plate element being a cement-receiving side contoured to fit substantially flushly against a prepared tooth surface; and
   the other side of said plate element having at least one projection integral with and supported by said plate element to engage amalgam, said projection being dimensioned to lie entirely within the projected external restored surface of a tooth when said plate element is cemented to a prepared surface thereof.

2. Structure according to claim 1 wherein said projection comprises a corrosion-resistant pin welded to said plate.

3. Structure according to claim 1 and including a plurality of amalgam engaging projections unitary with said plate and comprising burrs upstruck from said other surface thereof.

4. Structure according to claim 2 and including a plurality of corrosion-resistant pins welded to said plate.

5. Structure according to claim 4 wherein said pins are substantially parallel.

6. An improved method of restoring an injured tooth having a portion thereof destroyed comprising:
   a. removing surface irregularities in said tooth adjacent the destroyed portion to produce at least one smooth prepared surface;
   b. applying a layer of dental cement to said prepared surface;
   c. placing an interface plate having one cement-receiving side and the other side having at least one amalgam-retaining projection thereon, on said cement layer with the cement-receiving side contacting said cement layer;
   d. permitting said cement layer to set, whereby said interface plate is securely adhered to said perpared surface, and
   e. applying dental amalgam to said other side and said projection and allowing said amalgam to set and adhere to said plate, whereby a durable bond is effected between said amalgam and said tooth.

* * * * *